United States Patent [19]
Graham et al.

[11] Patent Number: 5,810,668
[45] Date of Patent: Sep. 22, 1998

[54] TORSIONAL SHOCK ISOLATED FUEL PUMP DRIVE GEAR ASSEMBLY

[75] Inventors: Karl T. Graham; Gordon E. Rado, both of Columbus, Ind.

[73] Assignee: Simpson International (UK) Ltd., Halifax, United Kingdom

[21] Appl. No.: 631,810

[22] Filed: Apr. 12, 1996

[51] Int. Cl.[6] .................................................. F16D 3/64
[52] U.S. Cl. ............................... 464/81; 74/411; 464/84; 464/101
[58] Field of Search .................................. 464/73, 74, 76, 464/82, 84, 92, 83, 89, 81, 100, 101; 74/443, 574, 411

[56] References Cited

U.S. PATENT DOCUMENTS

| | | | |
|---|---|---|---|
| 459,325 | 9/1891 | Whitney | 464/84 |
| 1,423,299 | 7/1922 | Batchelder | 464/84 |
| 1,857,679 | 5/1932 | Thomas | 464/84 X |
| 2,012,012 | 8/1935 | Kitzman | 464/74 |
| 2,446,942 | 8/1948 | McFarland | 464/74 |
| 2,514,897 | 7/1950 | Paulsen | 464/74 |
| 2,814,187 | 11/1957 | Babaian | 464/84 |
| 3,195,324 | 7/1965 | Sellwood et al. | 464/74 |
| 4,700,582 | 10/1987 | Bessette . | |
| 4,816,007 | 3/1989 | Box | 464/74 |
| 4,942,856 | 7/1990 | Jaki et al. | 464/92 X |
| 5,017,178 | 5/1991 | Krikke et al. . | |
| 5,188,002 | 2/1993 | Wolf et al. . | |
| 5,224,898 | 7/1993 | Johnson et al. | 464/74 X |
| 5,385,221 | 1/1995 | Van Maanen . | |
| 5,545,089 | 8/1996 | Kirschey | 464/83 |
| 5,564,981 | 10/1996 | Iwabuchi et al. | 464/92 X |

FOREIGN PATENT DOCUMENTS

| | | | |
|---|---|---|---|
| 536684 | 10/1931 | Germany . | |
| 837343 | 4/1952 | Germany . | |
| 39866 | 3/1983 | Japan | 74/411 |
| 380881 | 5/1973 | U.S.S.R. | 464/30 |
| 591637 | 2/1978 | U.S.S.R. | 464/74 |
| 224150 | 11/1924 | United Kingdom | 464/73 |
| 2089472 | 6/1982 | United Kingdom . | |

*Primary Examiner*—Eileen A. Dunn
*Attorney, Agent, or Firm*—Sixbey, Friedman, Leedom & Ferguson; Charles M. Leedom, Jr.

[57] ABSTRACT

A fuel pump drive gear assembly is provided which includes torsional absorption elements positioned between a drive gear and a fuel pump hub. The drive gear includes a plurality of apertures for receiving a plurality of projections formed on the fuel pump hub. The torsional absorption elements are positioned in the apertures between the projections and the drive gear so as to frictionally engage a surface of both the projection and the drive gear, thus creating a mechanical driving connection between the rotating drive gear and the fuel pump hub. The torsional absorption elements have adequate stiffness to provide the necessary torque to drive the fuel pump, while retaining sufficient flexibility to permit relative rotational movement between the driving gear and the fuel pump hub for absorbing the vibratory loads imposed upon the gear assembly by the fuel pump without compromising the timing between the fuel pump and engine.

9 Claims, 4 Drawing Sheets

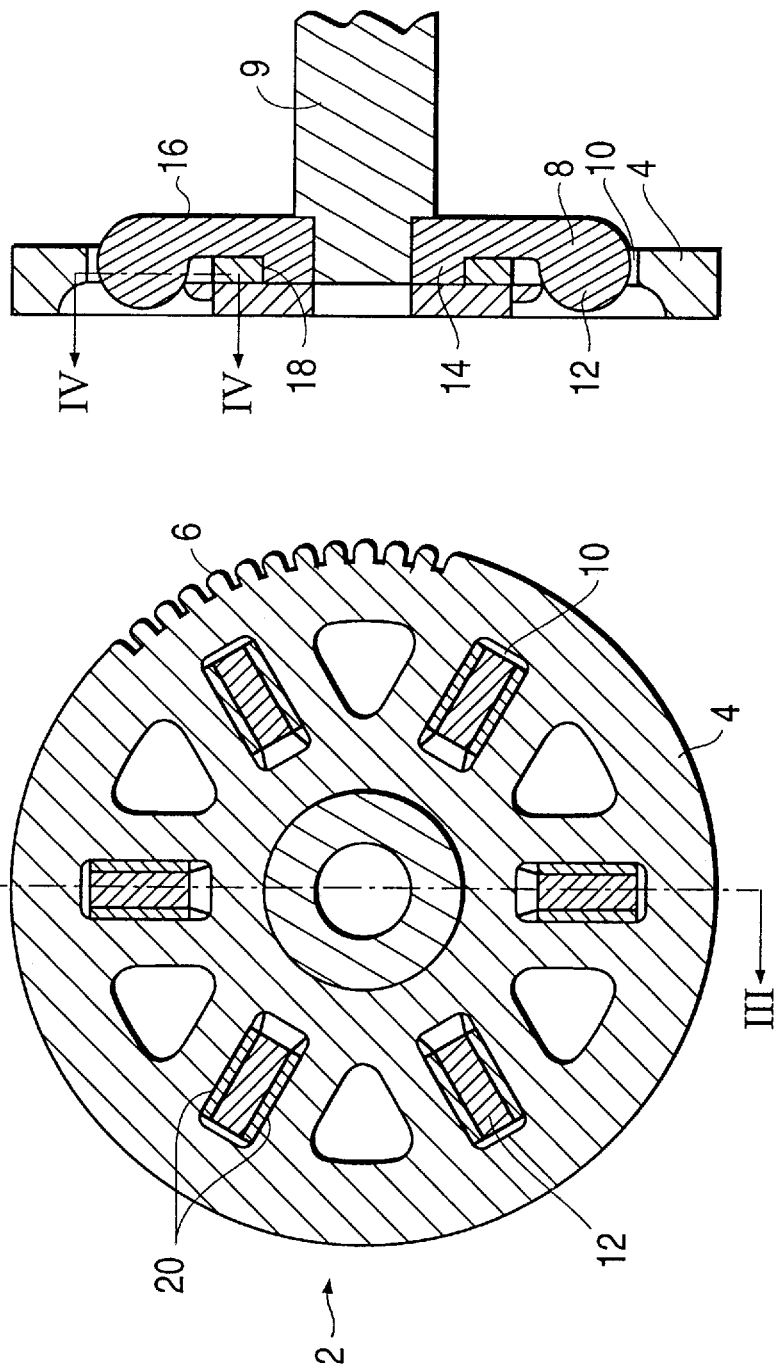

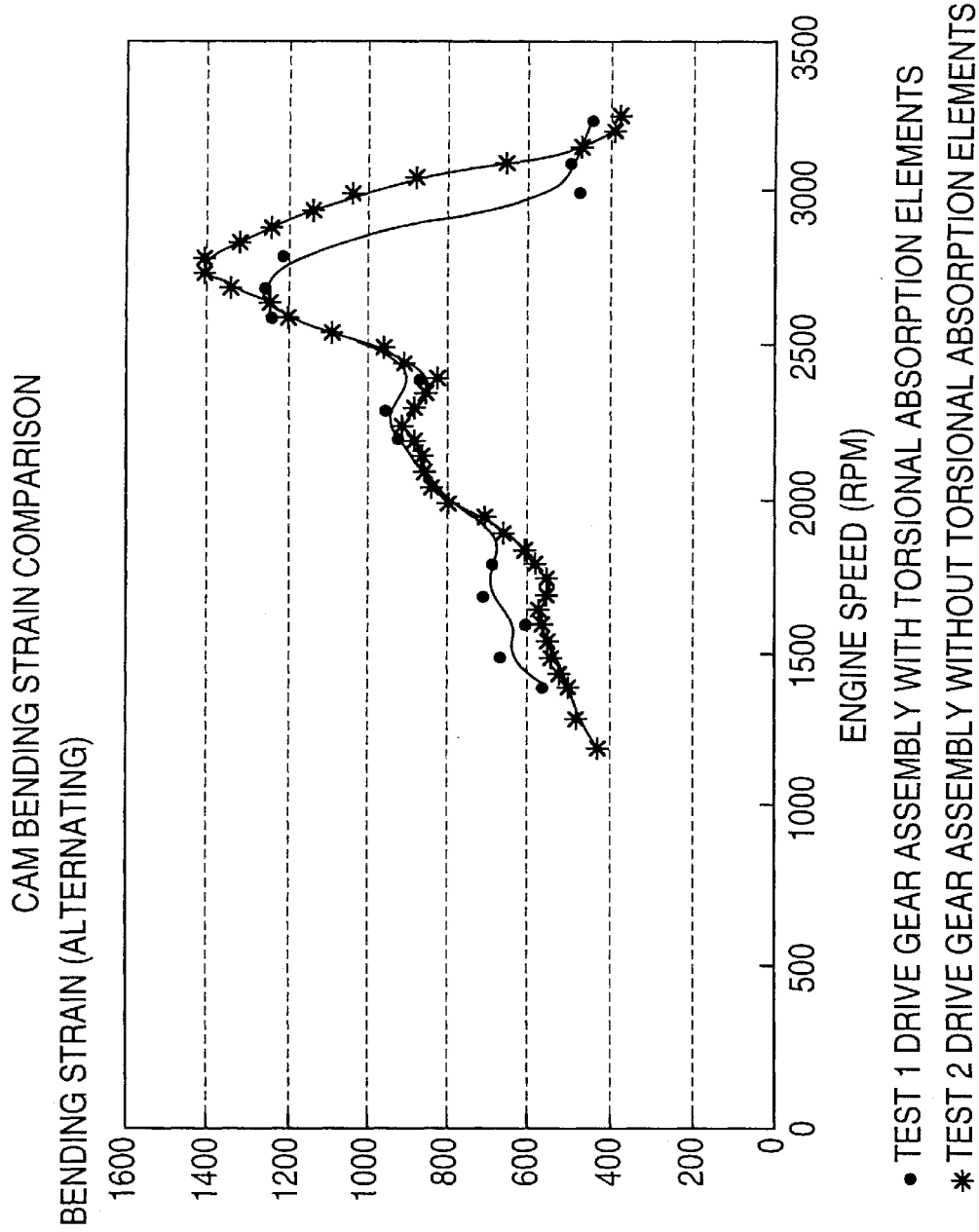

TORSIONAL SHOCK ISOLATED FUEL PUMP DRIVE GEAR ASSEMBLY

BACKGROUND OF THE INVENTION

1. Technical Field

The present invention relates to a fuel pump drive gear assembly having a torsional vibration absorber. More particularly, the present invention relates to a fuel pump drive gear assembly capable of absorbing torsional vibrations while permitting predictable and reliable operation of the fuel pump in a timed relationship to engine camshaft rotation.

2. Background Art

In internal combustion engines, critical torsional vibrations can increase noise, reduce gear life and cause premature engine failure. For example, the torque being transmitted to drive a camshaft of an engine starts out low and increases until a cam lobe activates a valve. The higher the load required to activate the valve, the greater the torsional load which must be overcome by the camshaft. The constant variation of loads on the camshaft from high loads, when the force of the valve springs and the springs of the unit injectors are being compressed, to no load, when the springs are released and the valves are closed, results in a wide range of working forces acting on the camshaft. These working forces cause the camshaft to twist and bend, i.e. wind-up, as the forces are applied and then untwist or unwind once the load is overcome or removed. During unwinding or backlash, the camshaft becomes an instantaneous driving member rather than a driven member, further inducing impact loads on the driving and driven members resulting in increased noise, reduced gear life and premature engine failure.

Furthermore, differential vibratory torsional displacements imposed upon the engine camshaft, through the gear train, by the crankshaft and the fuel pump create severe loads on the camshaft which cause camshaft and fuel pump shaft bending failures. These vibratory torsional displacements further contribute to a variety of gear train and noise problems. As the engine power and speed ranges expand, a method of eliminating torsional displacements is required to insure the structural integrity of the camshaft, gear train and valve train, and further to reduce the acoustic emissions resulting from gear train impact loads.

Conventional shock-absorbing torque transmission couplings, such as U.S. Pat. No. 2,446,942 to McFarland and Russian Patent 591,637, include a flexible elastic element positioned between driving and driven members. The resilient elements used in these couplings appear to permit significant relative rotational movement between the driving and driven shafts. However, in certain engine applications, relative rotational movement between the driven and driving members must be maintained at a minimum level to ensure the driven engine component, i.e. fuel pump, is operated in timed relationship to the driving member, i.e. camshaft, thus ensuring proper fuel pump operation. Without a sufficiently rigid driving connection between the crankshaft and the fuel pump, the pump would not operate predictably and reliably, possibly resulting in inefficient engine operation and/or damage. Therefore, resilient materials used in shock-absorbing couplings for an engine fuel pump must be sufficiently stiff to transmit the required high drive torque while absorbing torsional vibrations with sufficiently small deflection. The Russian '637 and McFarland references fail to disclose couplings used to drive engine components where rotational movement is critically timed to engine camshaft movement.

U.S. Pat. No. 5,017,178 issued to Krikke et al. discloses a coupling used for dampening torsional oscillations between a driven mechanism and a driving mechanism. In this coupling, an interface is provided between a camshaft and a cam gear for transmitting torque and dampening load variations applied thereto using spring-biased pistons in conjunction with a viscous fluid. However, the combination of viscous fluid with spring-biased pistons permits significant relative rotational movement between the cam gear and the camshaft. Therefore, this coupling does not permit the gear assembly to maintain adequate stiffness for transmitting the required high drive torque so as not to comprise the functional timing and positional relationship between the gear and shaft.

Additionally, prior shock-absorbing torque transmission couplings have not addressed the problems specifically confronting the bending strain placed on a camshaft by opposing torques being applied to the camshaft by the crankshaft on one side of the cam gear and by the fuel pump on the opposing side of the cam gear. Under normal operation of a fuel pump, torsional vibrations caused by fuel pump operation are transmitted through the fuel pump shaft and associated drive gear to a cam gear attached to one end of the camshaft. These vibratory torques sometimes oppose the torque imposed by the crankshaft which is connected to the camshaft on the opposing side of the cam gear from the fuel pump connection. These opposing torques create an undesired bending strain in the camshaft which may result in camshaft failure. Therefore, there is a need to reduce the opposing torques on the camshaft, and, therefore, ensure the structural integrity of the camshaft and reduce the acoustic emissions resulting from gear train impact loads.

Accordingly, there is clearly a need for a fuel pump drive gear assembly which provides a significant degree of torsional isolation for a camshaft from torsional vibrations generated by a fuel pump while transmitting the required high drive torque so as not to compromise the relative rotational relationship between the camshaft and fuel pump thereby ensuring proper operation of the fuel pump in timed relationship to the camshaft.

SUMMARY OF THE INVENTION

It is an object of the present invention to overcome the aforementioned shortcomings associated with the prior art.

Another object of the present invention is to provide an isolation mechanism which provides a degree of torsional isolation for a camshaft from the torsional displacements imposed upon it by a fuel pump.

Yet another object of the present invention is to provide an isolation mechanism which absorbs fuel pump torsional vibrations within the fuel pump drive gear thereby minimizing the torsional displacement differential imposed upon the cam gear and camshaft by the crankshaft and fuel pump.

It is a further object of the present invention to provide a torsional isolation mechanism for connecting driving and driven members which have adequate rigidity to transmit a high drive torque while experiencing small deflection so that the functional timing or positional relationship between the driving and driven members is not affected.

It is yet another object of the present invention to provide a torsional isolation mechanism which can be implemented in existing internal combustion engines without requiring a significant redesign of the fuel injection system.

A further object of the present invention is to provide a torsional isolation mechanism capable of absorbing torsional vibrations from a driven member only during predetermined engine speeds at which torsional vibrations are unacceptable while ensuring minimal relative rotation between the driving and driven members during all engine speeds and operating conditions.

These as well as additional objects and advantages of the present invention are achieved by providing a torsional absorption element between a drive gear and a fuel pump hub. The drive gear includes a plurality of apertures therein, wherein the fuel pump hub includes a plurality of projections axially aligned with the apertures in the drive gear. The projections from the fuel pump hub comprise a similar shape to that of the apertures in the drive gear so that projections fit within the apertures. Further provided between the projections and apertures are the torsional absorption elements, wherein the torsional absorption elements are positioned to frictionally engage a surface of both the projection and the aperture. Therefore, the torsional absorption element creates a mechanical driving connection between the rotating drive gear and the fuel pump hub. The torsional absorption elements have adequate stiffness to provide the necessary torque to drive the fuel pump, yet they retain sufficient flexibility to permit a relative rotation between the driving gear and the fuel pump hub, without compromising the timing between the fuel pump and engine under the vibratory loads imposed upon the gear assembly by the fuel pump.

These as well as additional advantages of the present invention will become apparent from the following description of the invention with reference to several figures.

BRIEF DESCRIPTION OF THE DRAWINGS

FIG. 2 is a side view of the fuel pump drive gear assembly in accordance with the preferred embodiment of the present invention.

FIG. 3 is a sectional view of the fuel pump drive gear assembly taken generally along line III—III of FIG. 2.

FIG. 5 is a graphic illustration of the bending strain imposed on a camshaft as a function of engine speed.

DETAILED DESCRIPTION OF THE PREFERRED EMBODIMENT

Figure 1:
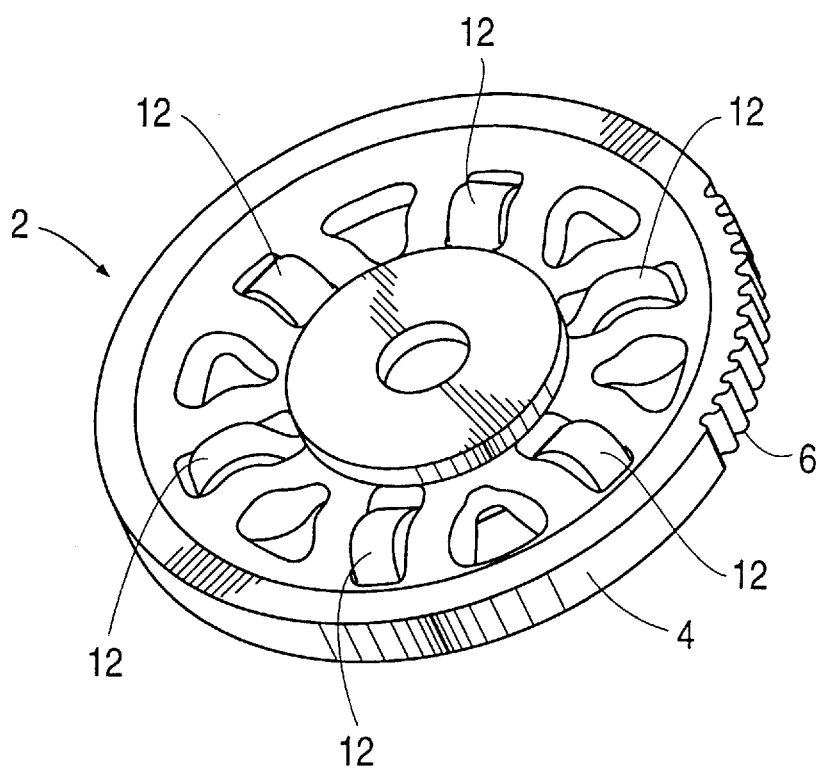
FIG. 1 is a perspective view of the fuel pump drive gear assembly in accordance with the preferred embodiment of the present invention.

Referring now to FIG. 1, a perspective view of the drive gear assembly 2 of the present invention is illustrated, wherein the drive gear assembly 2 couples a driving mechanism to a driven mechanism. While the discussion of the preferred embodiment of the present invention will be directed specifically to a fuel pump drive gear assembly 2, it is understood that the drive gear assembly 2 may be utilized in other applications having similar objectives to the present invention. In the preferred embodiment, the driving mechanism is a drive gear 4, which is driven by a cam gear (not shown) attached to a camshaft (not shown). The drive gear 4 includes teeth 6 extending around the entire periphery of the drive gear 4, even though only a portion of the perimeter of the drive gear 4 is illustrated in the Figures as having teeth. The teeth 6 engage with teeth on the cam gear, so that drive gear 4 rotates in response to the rotation of the cam gear. The driven mechanism in the preferred embodiment is a fuel pump hub 8, wherein the fuel pump hub 8 engages the drive gear 4 so that the fuel pump hub 8 rotates in conjunction with the rotation of the drive gear 4. The fuel pump hub 8 is further attached to a rotatable shaft 9 connected to the fuel pump (not shown) so that the fuel pump shaft 9 is driven by the rotation of fuel pump hub 8.

As more clearly shown in FIGS. 2 and 3, the drive gear 4 is generally annular in shape and includes a plurality of apertures 10 positioned about an inner peripheral surface of the drive gear 4. In the preferred embodiment of the present invention, the apertures 10 extend through the entire width of the drive gear 4. However, the apertures 10 may alternatively be formed as recesses in one side of the drive gear 4. The apertures 10 are preferably positioned at equal angular distances from one another about the longitudinal axis of the drive gear 4 for proper rotational balancing characteristics.

The fuel pump hub 8 includes a plurality of projections 12 which extend from one side of the fuel pump hub 8, wherein the projections 12 are positioned about the side of the fuel pump hub 8 to fit within respective apertures 10 in the drive gear 4. The side surfaces of the projections 12 comprise a similar shape as the side walls of apertures 10, while the projections 12 are of slightly smaller dimensions in size than apertures 10 so that each projection 12 may fit within an aperture 10. In the preferred embodiment of the present invention, the projections 12 and apertures 10 are generally of a complimentary rectangular shape. A rectangular shape results generally in flat side surfaces which provide optimum support for torsional absorption elements 20 discussed hereinbelow. However, it is understood to those in the drive gear art that the apertures 10 may comprise any suitable shape capable of sufficiently supporting elements 20. The drive gear 4 includes at least as many apertures 10 as there are projections 12 of the fuel pump hub 8. In one embodiment, the fuel pump hub 8 includes a circular center portion 14 having a plurality of arms 16 extending outwardly from the center portion 14 and angularly positioned in the same configuration as apertures 10. One of the projections 12 is formed on the end of each arm 16. The drive gear 4 includes a circular recessed portion 18 on one side for receiving center portion 14. The center portion 14 of the fuel pump hub 8 can be securely positioned within recessed portion 18 to resist movement in a lateral direction from the central axis of the annular drive gear 4. Furthermore, the drive gear 4 abuts the fuel pump hub 8 so that the side surfaces of the projections 12 are adjacent to the side surfaces of the drive gear forming apertures 10 when the drive gear 4 and fuel pump hub 8 are assembled.

Interposed between the side surfaces of the projections 12 and the side surfaces of the apertures 10 are torsional absorption elements 20 providing a mechanical driving connection between the drive gear 4 and fuel pump hub 8. The torsional absorption elements 20 are formed of an appropriate material having both adequate stiffness to effectively transmit torque from drive gear 4 to fuel pump hub 8 and sufficient flexibility to absorb torsional vibrations from the fuel pump hub 8 imparted by the fuel pump, without compromising fuel pump to engine timing. The amount of torsional vibrations absorbed by torsional absorption elements 20 is determined by the spring rate of the torsional absorption elements 20. The torsional absorption elements 20 are interference fit between the drive gear 4 and the fuel pump hub 8. The compression of the absorption elements 20 to form the interference fit is such that there is never a gap between the torsional absorption elements 20 and the side surfaces of either the projection 12 or apertures 10 which would allow the torsional absorption elements 20 to become dislodged from between the fuel pump hub 8 and the drive gear 4.

The size and spring rate of torsional absorption elements 20 are dictated by the particular fuel pump being used. Since fuel pumps are manufactured in a variety of different sizes, there are a variety of different shaft sizes which correspond with the different fuel pumps, and the spring rate of the torsional absorption elements 20 must be matched to the fuel pump being used. In the preferred embodiment of the present invention, the torsional absorption element 20 comprises a metallic Belleville spring. However, it is understood that other similar devices may be used as the torsional absorption element 20 as long as they absorb or limit the torsional vibration loads imposed upon the drive gear 4 while maintaining a functional timing and positional relationship between the drive gear 4 and the fuel pump hub 8.

During the operation of the fuel pump drive assembly, the camshaft is rotated by the rotation of a crank gear driving a cam gear mounted on the end of the camshaft which, in turn, rotates drive gear 4 positioned radially opposed, about the cam gear, to the crank gear. The rotating camshaft rotates a second cam gear mounted on the opposite end of the camshaft from the first cam gear for engaging and rotating drive gear 4 in conjunction with camshaft. As discussed above, the rotation of drive gear 4 drives fuel pump hub 8 through the interconnection between projections 12 of hub 8 and apertures 10 of drive gear 4. The fuel pump hub 8 is, in turn, connected to rotatable shaft 9 which extends from the fuel pump hub 8 to the fuel pump.

Under normal operating conditions, the crank shaft gear and the fuel pump drive gear 4 will be turning in the same direction in a steady state condition. However, the crank shaft gear and the fuel pump drive gear 4 will be exerting torsional vibrations on radially opposed sides of the camshaft. For instance, the impulse firing of each cylinder in the engine creates an impact that causes the crank shaft to have a torsional vibration, which is in turn passed on to the camshaft through the cam gear. Similarly, each time a plunger or cylinder in the fuel pump injects a quantity of fuel, an impact load is created on the shaft of the fuel pump which also imparts torsional vibrations on the camshaft through the cam gear. These torsional vibrations cause the crank shaft gear and fuel pump drive gear 4 to speed up or slow down about some steady state speed. In other words, the fuel pump drive gear and crank shaft gear are turning at the same steady state speed but not necessarily in phase with each other. These engine torsional vibrations may cause the crank shaft to instantaneously speed up while the fuel pump is instantaneously slowing down. This relative difference in speed between the crank shaft gear and the fuel pump drive gear imparts opposing rotations on the camshaft which creates a bending strain on the camshaft. Therefore, in order to reduce or eliminate the bending strain across the camshaft, it is necessary to absorb the torsional vibrations created by the fuel pump before they reach the camshaft, while transmitting the required torque between the camshaft and the fuel pump drive gear to achieve fuel pump to engine timing.

Figure 4:
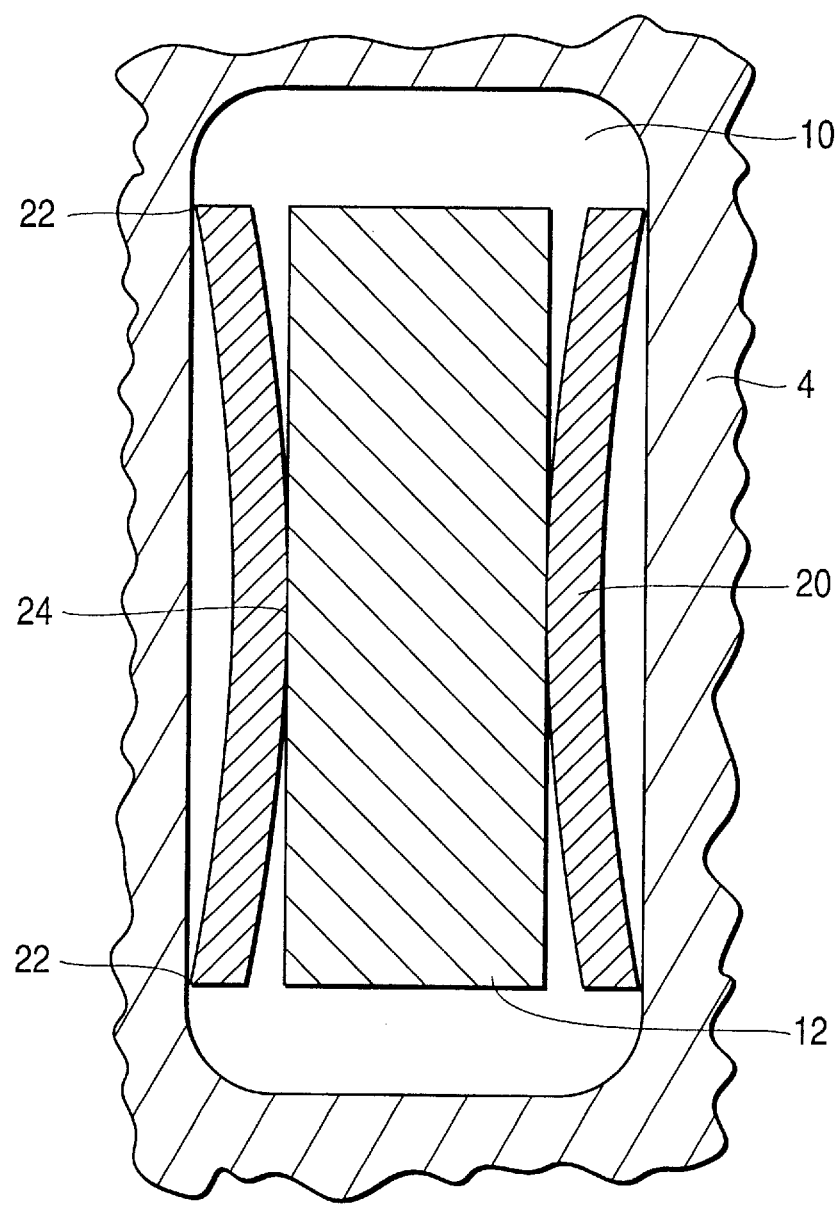
FIG. 4 is an enlarged sectional view showing the connection of the torsional absorption element in the fuel pump drive gear assembly taken generally along line IV—IV of FIG. 3.

Referring now to FIG. 4, an enlarged view of the interference fit of the torsional absorption element 20 between the projection 12 of fuel pump hub 8 and the side surface of the aperture 10 is illustrated. In the preferred embodiment, the torsional absorption element 20 comprises a substantially rigid, curved element, such as a Belleville spring. It is essential that the torsional absorption element 20 is substantially rigid in order to maintain adequate stiffness to transmit the required torque from the drive gear 4 to the fuel pump hub 8 without compromising fuel pump to engine timing. However, torsional absorption element 20 is also designed with a resilient, spring characteristic for absorbing the torsional vibrations/loads exerted by the fuel pump hub 8. Specifically, torsional absorption element 20 is designed with a predetermined thickness, a predetermined curvature and of a material which creates the desired absorption/spring characteristic. The curvature of the element 20 enables the element to flex and straighten when subjected to torsional loads greater than a predetermined minimum torsional load necessary to overcome the rigidity of the torsional absorption element 20. The torsional absorption element 20 is preferably composed of a metallic substance; however, it is understood that any substantially rigid material having sufficient spring characteristics may be used. If a material other than a metallic substance is utilized, it is not necessary for the torsional absorption element 20 to be curved as long as it has the adequate stiffness to effectively transmit torque while having sufficient spring characteristics to absorb torsional loads without compromising fuel pump to engine timing.

The torsional absorption element 20 must be slightly compressed in order to form the interference fit between the projection 12 and the side surface of aperture 10. As the drive gear 4 rotates, the drive gear 4 imparts a force on portions 22 of the torsional absorption elements 20 contacting the side surfaces of apertures 10. This force is then transmitted to the projections 12 through portions 24 of torsional absorption elements 20 contacting the side surface of the projections 12. Therefore, the torsional absorption elements 20 create a mechanical driving connection between the fuel pump hub 8 and the driving gear 4. Once the torsional loads imparted on the torsional absorption elements 20 from the fuel pump are greater than the rigidity of the torsional absorption elements 20, the torsional absorption elements 20 will absorb these loads by flexing in the appropriate direction. The torsional absorption elements 20 will continue to transmit the force exerted by drive gear 4 to fuel pump hub 8 while flexing, so that the torsional absorption elements 20 absorb the torsional loads without compromising fuel pump to engine timing.

Although FIG. 4 illustrates the torsional absorption element 20 having its concave side facing the side surface of aperture 10, alternatively, the torsional absorption element 20 may be positioned with its concave side facing projection 12. In this alternative embodiment, the portions 22 of torsional absorption element 20 would contact projection 12 while portion 24 would contact the side surface of aperture 10. The amount of curvature and material composition of the torsional absorption element 20 is dictated by the particular fuel pump being used, so that the torsional absorption element 20 may be selected depending upon the amount of torsional load it must absorb.

Referring now to FIG. 5, a graphic illustration of the bending strain imposed on a camshaft as a function of engine speed is shown. FIG. 5 shows a comparison of the bending strain imposed on a camshaft by fuel pump drive gear assembly 2 having the torsional absorption elements 20, used in Test 1, and a fuel pump drive gear assembly having a conventional rigid connection between the fuel pump hub and drive gear without torsional absorption elements, used in Test 2. The graph illustrates that at lower engine speeds the bending strain on the cam shaft is substantially the same for the drive gear assemblies with and without the torsional absorption elements 20. This result occurs because the torsional vibrations at low engine speeds are relative small and are not substantial enough to overcome the stiffness of torsional absorption elements 20. These low speed torsional vibrations typically do not produce undue strain on the camshaft. The torsional absorption elements 20 therefore provide a substantially rigid connection between the fuel pump hub and drive gear at low engine speeds, thus ensuring rotation of the fuel pump hub in optimal timed relationship to the drive gear and thus the camshaft. The nature of internal combustion engines is such that torsional vibrations are greater at the higher speed ranges which creates high bending strains in the camshaft through the interaction of the fuel pump torsional vibrations and the engine crank torsional vibrations. The torsional absorption elements of the present invention are specifically designed to most effectively absorb these high speed torsional vibrations. Therefore, at higher engine speeds, the torsional vibrations are sufficiently large to overcome the stiffness of the torsional absorption elements 20 so that the torsional absorption elements 20 begin to absorb the torsional load. It can be seen that at higher engine speeds, the bending strain imposed on the camshaft was much higher for the fuel pump drive gear assembly which did not include the torsional vibration elements 20 of the present invention. Therefore, there is a significant reduction in the bending strain across the camshaft at higher speeds by the fuel pump drive gear assembly 2 having the torsional absorption elements 20. The torsional absorption elements 20 are specifically designed to create a relatively rigid connection and transmit torsional loads up to a certain minimum torsional load. Once the minimum torsional load is reached, the torsional absorption elements 20 will begin to flex or collapse, thus absorbing the torsional load. In the particular engine tested, the present torsional shock isolated fuel pump assembly begins most effectively absorbing torsional loads at approximately 2600 RPM. The torsional absorption elements 20 will eventually fully collapse or compress as the torsional load continues to increase, and the fully compressed torsional absorption elements 20 will once again provide a rigid connection between the fuel pump hub and the drive gear. Therefore, at extremely high torsional loads and engine speeds, the bending strain on the camshaft will be substantially the same for drive gear assemblies both with and without torsional absorption elements 20. Alternatively, the torsional absorption elements 20 may be manufactured such that they will never fully compress and will always be capable of absorbing torsional loads.

The need to reduce camshaft bending strain at high engine speeds is particularly important in many industrial applications. In today's industrial and construction applications, more and more machines are hydrostatically operated which means they are driven by the internal combustion engine to which they are connected. The engine often drives a large hydraulic pump that powers a number of arms, such as the boom on a back hoe, which utilize hydrostatic propulsion. These engines basically will run at wide open throttle or high speeds in the actual working conditions in order to provide the required hydraulic power, so they tends to operate at the higher end of the engine speed operating range. Therefore, in order to maintain the structural integrity of the camshaft, it is important to utilize the torsional absorption elements 20 in the fuel pump drive gear assembly 2 to reduce the large bending strain imposed on the camshaft at these high speeds.

As can be seen by the foregoing, a fuel pump drive gear assembly formed in accordance with the present invention will reduce the bending strain imposed on a camshaft by absorbing torsional loads imposed by the fuel pump. Moreover, by forming a fuel pump drive gear assembly in accordance with the present invention, a degree of torsional isolation is provided for a camshaft from the torsional displacements imposed upon it by a fuel pump. Additionally, the torsional shock isolated fuel pump drive gear assembly formed in accordance with the present invention provides a rigid connection necessary to transmit a high drive torque from a drive gear to the fuel pump hub so that the functional timing or positional relationship between the fuel pump and the engine is not affected throughout all engine speeds, while effectively absorbing torsional vibrations and loads of significant magnitudes to minimize camshaft bending stress, especially during high engine speeds.

What is claimed is:

1. A torsional vibration absorption device for absorbing torsional vibrations generated by a fuel pump while providing the necessary torque to drive the fuel pump comprising:

a driven shaft connected to the fuel pump;

a fuel pump hub connected to said driven shaft, said fuel pump hub including a center portion engaging said driven shaft, a plurality of arms extending radially outwardly from said center portion and a respective projection positioned at a distal end of each of said plurality of arms, each of said plurality of arms being circumferentially spaced from each adjacent arm;

a drive gear for imparting a rotational drive force to said fuel pump hub, said drive gear including an inner peripheral surface and a plurality of apertures formed in said inner peripheral surface, each respective projection being positioned to fit within a respective one of said plurality of apertures; and torsional vibration absorption means for absorbing torsional vibrations generated by the fuel pump while providing torque necessary to drive the fuel pump hub in timed relationship to said drive gear, said torsional vibration absorption means being positioned in at least one of said apertures between said respective projection and said, drive gear.

2. The torsional absorption device as defined in claim 1, wherein said torsional absorption means comprises a Belleville spring.

3. The torsional absorption device as defined in claim 2, wherein said Belleville spring is metallic.

4. The torsional absorption device as defined in claim 1, wherein said torsional absorption means is formed of a non-elastomeric material positioned in abutment against said respective projection and said drive gear.

5. The torsional absorption device as defined in claim 1, wherein said respective projection is of a similar cross-sectional shape as a cross-sectional shape of said apertures in said drive gear.

6. The torsional absorption device as defined in claim 1, wherein said apertures are rectangular in shape.

7. The torsional absorption device as defined in claim 6, wherein said torsional absorption means is positioned in abutment against one side of said respective projection and a portion of said drive gear within said rectangular aperture.

8. The torsional absorption device as defined in claim 7, wherein said torsional absorption means are positioned on two sides of said respective projection.

9. The torsional absorption device as defined in claim 8, wherein said torsional absorption means are juxtapositioned on opposing sides of said respective projection.

* * * * *